(12) United States Patent
Watanabe

(10) Patent No.: US 6,888,567 B2
(45) Date of Patent: May 3, 2005

(54) ELECTRONIC PHOTOGRAPHING APPARATUS AND ELECTRONIC PHOTOGRAPHING APPARATUS SYSTEM

(75) Inventor: Sayuri Watanabe, Tokyo (JP)

(73) Assignee: Olympus Corporation (JP)

( * ) Notice: Subject to any disclaimer, the term of this patent is extended or adjusted under 35 U.S.C. 154(b) by 0 days.

(21) Appl. No.: 09/969,084

(22) Filed: Oct. 1, 2001

(65) Prior Publication Data

US 2002/0039146 A1 Apr. 4, 2002

(30) Foreign Application Priority Data

Oct. 3, 2000 (JP) ....................... 2000-303833

(51) Int. Cl.⁷ .................... H04N 5/232; H04N 5/222
(52) U.S. Cl. ................ 348/211.8; 348/333.12; 348/345; 348/346; 348/333.01; 348/552; 348/207.1
(58) Field of Search .............. 348/207.1, 211.12, 348/211.13, 211.14, 211.7, 211.8, 345, 350, 229.1, 346, 333.12

(56) References Cited

U.S. PATENT DOCUMENTS

| | | | |
|---|---|---|---|
| 5,150,146 A | * 9/1992 | Ueda et al. | 396/104 |
| 5,204,709 A | * 4/1993 | Sato | 396/263 |
| 5,235,380 A | * 8/1993 | Yamada et al. | 396/289 |
| 5,311,241 A | * 5/1994 | Akashi et al. | 396/104 |
| 5,361,119 A | * 11/1994 | Shida et al. | 396/121 |
| 5,410,383 A | * 4/1995 | Kusaka et al. | 396/102 |
| 5,528,289 A | * 6/1996 | Cortjens et al. | 348/14.05 |
| 5,528,330 A | * 6/1996 | Utagawa | 396/96 |
| 5,532,782 A | * 7/1996 | Mori et al. | 396/89 |
| 5,617,162 A | * 4/1997 | Kato et al. | 396/318 |
| 5,625,415 A | * 4/1997 | Ueno et al. | 348/350 |
| 5,784,655 A | * 7/1998 | Akashi et al. | 396/128 |
| 5,792,596 A | * 8/1998 | Yasuzato et al. | 430/327 |
| 5,793,367 A | * 8/1998 | Taguchi | 345/756 |
| 5,898,600 A | * 4/1999 | Isashi | 345/169 |
| 5,920,342 A | * 7/1999 | Umeda et al. | 348/211.14 |
| 5,943,050 A | * 8/1999 | Bullock et al. | 345/783 |
| 6,081,670 A | * 6/2000 | Madsen et al. | 396/88 |
| 6,118,943 A | * 9/2000 | Ohsawa | 396/51 |
| 6,122,450 A | * 9/2000 | Nakahara et al. | 396/123 |
| 6,130,417 A | * 10/2000 | Hashimoto | 250/201.2 |
| 6,141,052 A | * 10/2000 | Fukumitsu et al. | 348/14.08 |
| 6,148,113 A | * 11/2000 | Wolverton et al. | 382/254 |
| 6,163,653 A | * 12/2000 | Sato | 396/121 |
| 6,266,085 B1 | * 7/2001 | Kato et al. | 348/143 |
| 6,292,215 B1 | * 9/2001 | Vincent | 348/142 |

* cited by examiner

*Primary Examiner*—Andrew Christensen
*Assistant Examiner*—Brian Genco
(74) *Attorney, Agent, or Firm*—Ostrolenk, Faber, Gerb & Soffen, LLP

(57) ABSTRACT

A photographing optical system photographs an object as an image. A data processing section converts an optical image of the object photographed by the photographing optical system into digital image data, and records the converted image data. A display section displayed the image data converted by the data processing section. A distance measuring section measures a distance to the object at a predetermined distance measurement point. An external operating member is capable of externally operating a state of the electronic photographing apparatus. A specification section specifies at least one point of the image displayed at the display section. A control section changes the predetermined distance measurement point caused by the distance measuring section based on information specified by the specification section and an operation caused by the external operating member.

15 Claims, 8 Drawing Sheets

ELECTRONIC PHOTOGRAPHING APPARATUS AND ELECTRONIC PHOTOGRAPHING APPARATUS SYSTEM

CROSS-REFERENCE TO RELATED APPLICATIONS

This application is based upon and claims the benefit of priority from the prior Japanese Patent Application No. 2000-303833, filed Oct. 3, 2000, the entire contents of which are incorporated herein by reference.

BACKGROUND OF THE INVENTION

1. Field of the Invention

The present invention pertains to an electronic photographing apparatus and an electronic photographing apparatus system. More particularly, the present invention relates to an electronic photographing apparatus and an electronic photographing apparatus system for converting an optical image of a photographed object into digital image data, and recording the converted image data, comprising a display device for displaying an image to be photographed by a photographer, making it possible to specify a focusing position or the like on a display screen.

2. Description of the Related Art

In recent years, an electronic photographing apparatus such as an electronic still camera or digital camera comprises a display device for displaying an image to be photographed by a photographer so that the photographer can photograph an image while watching the photographing screen.

That is, in such an electronic photographing apparatus, the photographer can photograph an image while watching the photographing screen, thereby making it possible to check a photographing state of an object in advance, which is convenient.

In this case, the display device for displaying an image to be photographed by the photographer is incorporated in an electronic photographing apparatus itself such as a digital camera or utilizes a monitor such as an external personal computer (PC) that communicates with the electronic photographing apparatus.

However, in the conventional electronic photographing apparatus as described above, although the photographer photographs an image while watching the photographing screen, thereby making it possible to check a photographing state of an object in advance, which is convenient, the following problems have been still unsolved.

First, when a display device for displaying an image to be photographed by a photographer is incorporated in an electronic photographing apparatus itself such as a digital camera, in general, the size of a display screen is about several inches, which is very small, whereby the photographed image is small, and a coarse image is produced. Thus, there has been a problem that the focused state of an object is hardly judged from such a photographed image.

In addition, even when a display device for displaying an image photographed by a photographer generally utilizes a monitor such as a personal computer that uses a display screen of about 10 inches in size, there has been a problem that it is difficult to judge which part of an object is focused from such a photographed image.

BRIEF SUMMARY OF THE INVENTION

The present invention has been made in order to solve the foregoing problem. It is an object of the present invention to provide an electronic photographing apparatus and an electronic photographing apparatus system comprising a display device for displaying an image to be photographed by a photographer, for specifying and inputting a focusing position or the like in advance on a display screen, thereby making it possible to control a desired object on the photographed image to be focused, for example.

In order to achieve the foregoing object, according to the present invention, there is provided an electronic photographing apparatus comprising:

a photographing optical system which photographs an object;

a data processing section which converts an optical image photographed by the photographing optical system into digital image data, and records the converted image data therein;

a display section which displays the image data obtained by the data processing section;

a distance measuring section which measures a distance to the object at a predetermined distance measurement point;

an external operating member capable of externally operating a state of the electronic photographing apparatus;

a specification section which specifies at least one point of the image displayed at the display section; and a control section which changes the predetermined distance measurement point caused by the distance measuring section based on information specified by the specification section and an operation made by the external operating member.

In addition, according to the present invention, there is provided an electronic photographing apparatus comprising:

a photographing optical system which photographs an object;

a data processing section which converts an optical image of the object photographed by the photographing optical system into digital image data, and records the converted image data therein;

a display section which displays the image data obtained by the data processing section;

a specification section which specifies a plurality of points in an image displayed at the display section;

an external operating member capable of externally operating a state of the electronic photographing apparatus; and a control section which controls an operation concerning photographing by the electronic photographing apparatus based on information specified by the specification section and an operation made by the external operating member.

Further, according to the present invention, there is provided an electronic photographing apparatus system composed of an electronic photographing apparatus for converting an optical image of a photographed object in digital image data and a personal computer, comprising:

a display module disposed in the personal computer, for displaying the image data;

a specification module which specifies an arbitrary image from among the images displayed at the display module;

a distance measuring module disposed in the electronic photographing apparatus, for measuring a distance to the object; and a control module which controls the distance measuring module to execute a distance measuring operation relevant to an image specified by the specification module.

Furthermore, according to the present invention, there is provided an electronic photographing apparatus system composed of an electronic photographing apparatus and a personal computer, comprising:

a display device disposed in the personal computer, for displaying an image photographed by the electronic photographing apparatus;

a pointing device disposed in the personal computer or connected thereto;

a distance measuring device disposed in the electronic photographing apparatus; and a control device disposed in the electronic photographing apparatus, wherein the control device controls the distance measuring device to be actuated so as to focus an arbitrary image when the image is specified from among the images on the display device by the pointing device.

Still furthermore, according to the present invention, there is provided an electronic photographing apparatus system composed of an electronic photographing apparatus and a personal computer, comprising:

a display device disposed in the personal computer, for displaying an image photographed by the electronic photographing apparatus;

a pointing device disposed in the personal computer or connected thereto;

a distance measuring device disposed in the electronic photographing apparatus; and a control device disposed in the electronic photographing apparatus, wherein the control device controls the distance measuring device to be actuated so as to focus an average distance of a plurality of images when the plurality of images are specified from among the images on the display device by the pointing device.

Yet furthermore, according to the present invention, there is provided an electronic photographing apparatus comprising:

a photographing optical system which photographs an object;

a data processing section which converts an optical image of the object photographed by the photographing optical system into digital image data, and records the converted image data therein;

a display section which displays the image data obtained by the data processing section;

a specification section which specifies at least one point of the image displayed at the display section; and a control section which changes an operation concerning photographing based on information specified by the specification section.

Moreover, according to the present invention, there is provided a method for measuring a distance of an electronic photographing apparatus system that is composed of an electronic photographing apparatus for converting an optical image of a photographed object into digital image data and a personal computer, comprising:

photographing an object by the electronic photographing apparatus;

displaying the object image at a display module disposed in the personal computer;

specifying an arbitrary image from among the images displayed at the display module; and causing a distance measuring module disposed in the electronic display module to execute a distance measuring operation relevant to the specified image.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Figure 1:
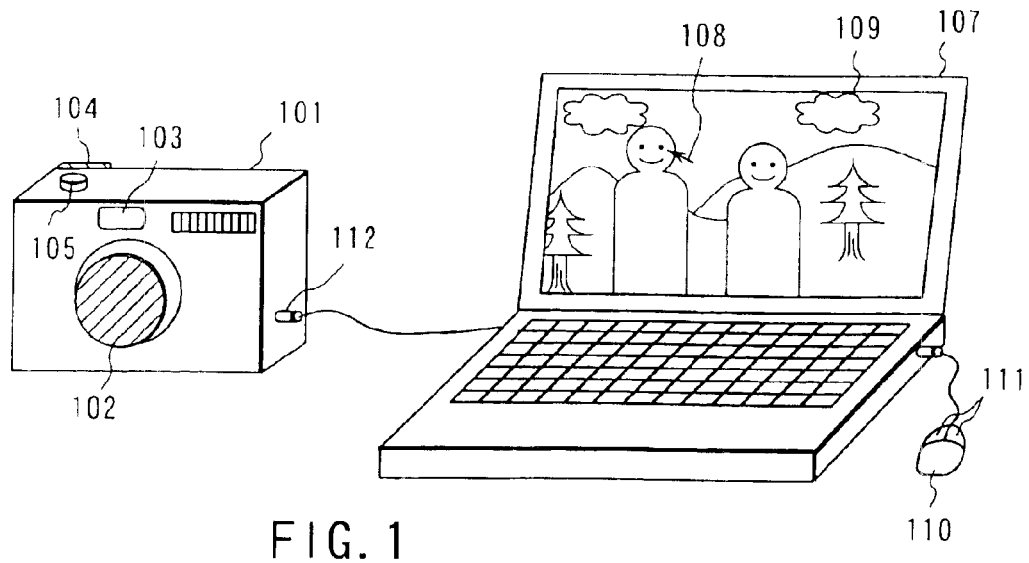
FIG. 1 is a view showing a schematic configuration of an electronic photographing apparatus system according to a first embodiment of the present invention.

Reference will now be made in detail to the presently preferred embodiments of the invention as illustrated in the accompanying drawings, in which like reference numerals designate like or corresponding parts.

Hereinafter, preferred embodiments of the present invention will be described with reference to the accompanying drawings.

The present invention relates to an electronic photographing apparatus and an electronic photographing apparatus system such that a photographer can specify and input a focusing position of a photographed image. As input means, for example, by using a display device such as a liquid crystal screen as a monitor of a personal computer (PC), the photographer can input a focusing position visibly and understandably, and lens drive value computation of focusing can be simplified by limiting a focusing point.

(First Embodiment)

FIG. 1 is a view showing a schematic configuration of an electronic still camera 101 applied as a first embodiment of an electronic photographing apparatus system according to the present invention.

As shown in FIG. 1, the electronic still camera 101 configuring an electronic photographing apparatus comprises a lens 102 of a digital photographing optical system for obtaining image data photographed by the electronic still camera 101, an object section 103 of an optical finder, a zoom switch (TELE switch or WIDE switch) 104, and a release button 105.

In addition, as shown in FIG. 1, a PC 107 can communicate image data and focus position information mutually via the electronic still camera 101 and a communication line 112.

This PC 107 comprises a monitor display 109 as a display module which displays image data photographed by the electronic still camera 101, a cursor 108 as a specification module which specifies a focus position (a distance measurement point) on the monitor display 109, and a mouse 110 as a pointing device which moves the cursor 108.

Here, the mouse 110 comprises a click button 111 which determines the focus position.

This click button 111 can determine a position by left-clicking it, and further, can make a release operation by double-clicking it.

Figure 2:
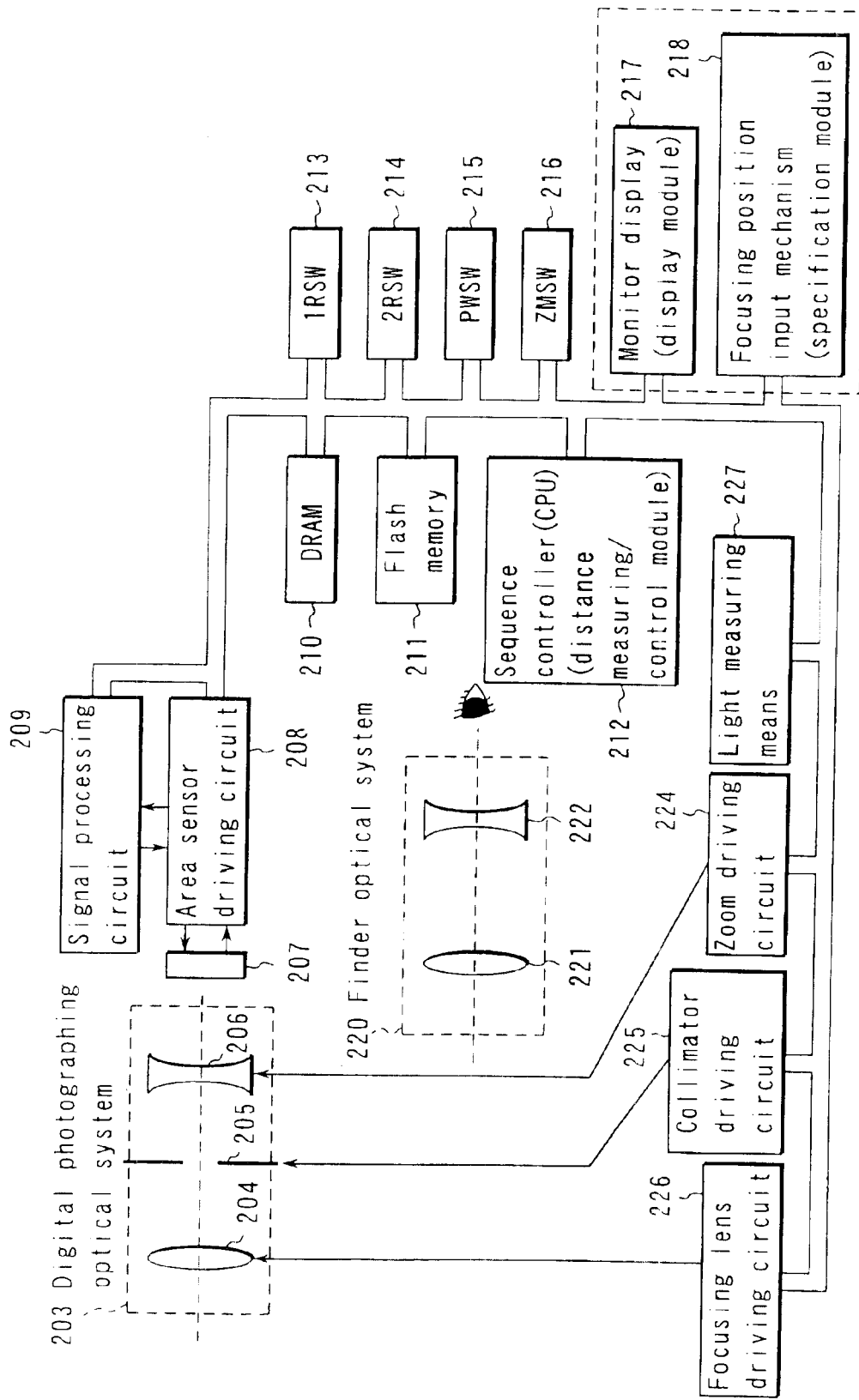
FIG. 2 is a block diagram showing an internal configuration of an electronic still camera 101 as an electronic photographing apparatus in the electronic photographing apparatus system according to the first embodiment of the present invention.

FIG. 2 is a block diagram showing an internal configuration of an electronic still camera 101 as an electronic photographing apparatus applied as an electronic photographing apparatus system according to the first embodiment of the present invention as described above.

As shown in FIG. 2, in the electronic still camera 101 as the electronic photographing apparatus, a photographing optical system 203 for digitally photographing comprises a focusing lens 204 provided inside of the digital photographing optical system 203, a collimator 205, and a zooming lens 206.

An optical image of an object photographed by such photographing optical system 203 is formed by an area sensor 207 for digitally photographing.

This area sensor 207 is controlled to be driven by an area sensor driving circuit 208, and an analog video signal from the area sensor 207 is received by the area sensor driving circuit 208.

Then, a signal processing circuit 209 as a data processing section receives an analog video signal from the area sensor driving circuit 208, converts the analog video signal into a digital video signal, and further, carries out predetermined signal processing such as color conversion.

In addition, the digital video signal from the signal processing circuit 209 is temporarily stored in a DRAM 210 that is a nonvolatile memory capable of writing at a high speed.

The digital video signal temporarily stored in this DRAM 210 is stored in a flash memory 211.

This flash memory 210 can rewrite data electrically. Thus, even if a power switch (PWSW) 215 of the electronic still camera 101 is turned OFF or even if no battery is loaded, the storage of an electronic image is held. Thus, this flash memory is used for storing an electronic image.

A sequence controller (CPU) 212 as a control module and a distance measuring module carries out sequence control of the entire apparatus.

This CPU 212 analyzes contrast information obtained from the area sensor 207, and carries out auto focus (AF) computation in accordance with a so called contrast climbing system. Then, the CPU obtains a lens drive quantity for focusing, and controls driving of such focusing. Further, the CPU controls during one second of collimator/shutter based on a light measurement value inputted from publicly known light measuring means 227.

In addition, a first release switch (1RSW) 213 is turned ON by a first stroke of the release button 105 of the electronic still camera 101.

That is, as described previously, when the PC 107 is connected to the electronic still camera 101, a predetermined action is made by an operation such as left-clicking using the click button 111 of the mouse 110, whereby this 1RSW 213 is turned ON if there is an input signal from the PC 107 to the CPU 212.

A second release switch (2RSW) 214 is turned ON by a second stroke of the release button 105 of the electronic still camera 101.

That is, as described previously, when the PC 107 is connected, a predetermined action is made by operation such as double-clocking using the click button 111 of the mouse 110, whereby this 2RSW 214 is turned ON if there is an input signal from the PC 107 to the CPU 212.

A zooming switch (ZMSW) 216 comprises: a TELE switch (an operating switch for long-focus driving) for zooming; and a WIDE switch (an operating switch for short-focus driving).

A monitor display 217 displays an image caused by a digital video signal stored in the flash memory 211 via the signal processing circuit 208. A focusing position (distance measurement point) input mechanism 218 detects a position of the cursor 108 on the monitor display 109 of the PC 107, and inputs the position information to the CPU 212.

A finder optical system 220 comprises a focusing lens group 221 provided inside of the finder optical system 220, and a zooming lens group 222 of the finder optical system 220.

A zooming driving circuit 225 drives the zooming lens group 204 in the digital photographing optical system 203 in an optical axis direction, thereby making a zooming operation.

A collimator driving circuit 224 drives opening/closing of the collimator 205 in the digital photographing optical system 203.

A focusing lens driving circuit 226 drives in the optical axis direction the focusing lens group 204 for carrying out focusing in the digital photographing optical system 203 based on a lens drive quantity computed by the CPU 212.

Figure 3:
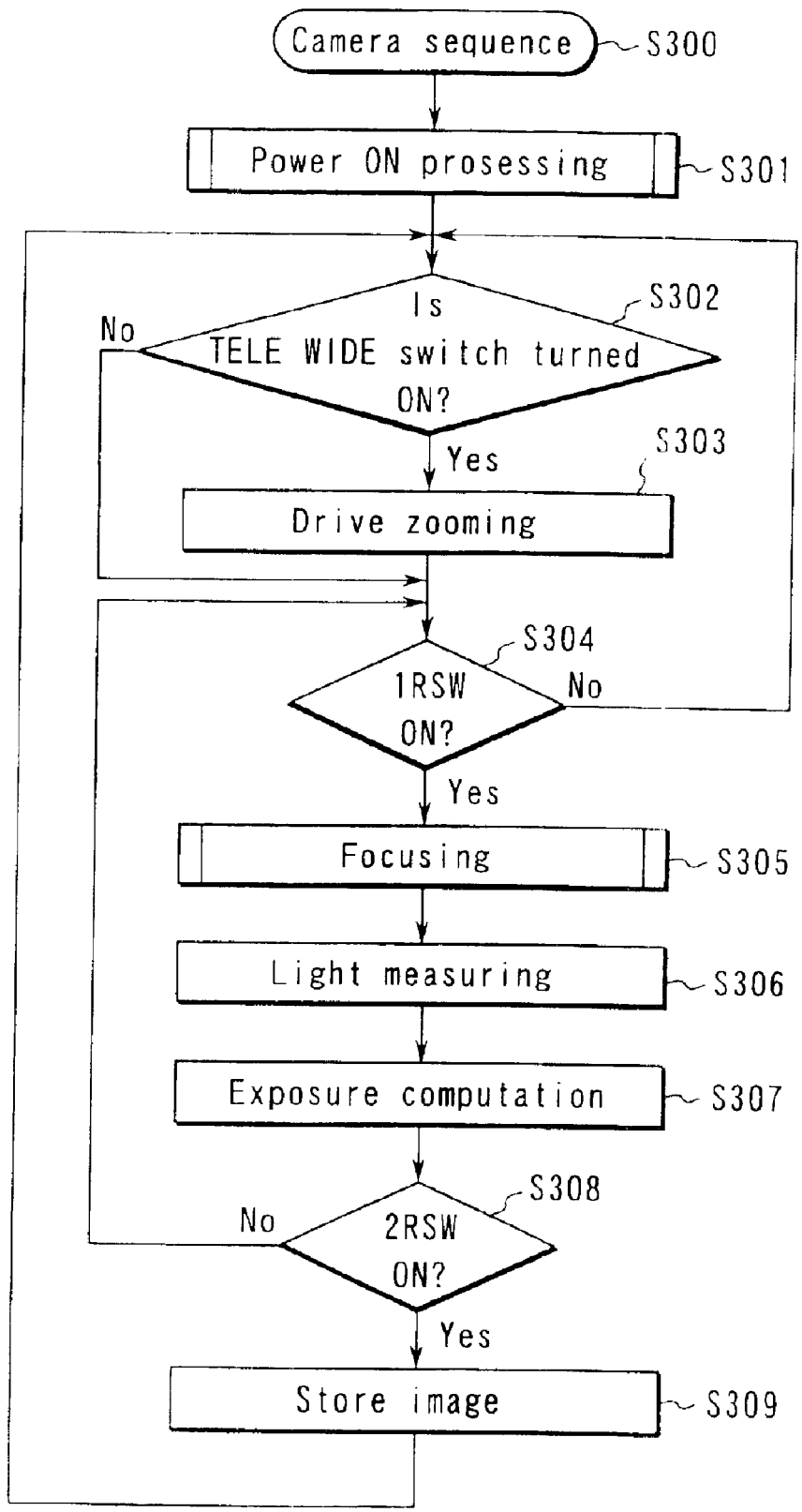
FIG. 3 is a flowchart for illustrating a camera sequence at the electronic still camera 101 of the electronic photographing apparatus system according to the first embodiment of the present invention.

FIG. 3 is a flowchart for illustrating a camera sequence at the electronic still camera 101, in particular, of the electronic photographing apparatus system according to the first embodiment of the present invention as described above.

First, at step S300, the PWSW 215 is turned ON, whereby the CPU 212 starts a camera sequence.

At step S301, the CPU 212 carries out camera power ON processing, whereby the digital photographing optical system 203 and the finder optical system 220 are fed from a sink position (not shown) to a wide position, and when the PC 107 is connected to the electronic still camera 101, a setup is carried out for mutual communication to exchange image information.

Next, at step S302, the CPU 212 judges whether or not a TELE-WIDE switch of the ZMSW 216 is set to ON. When the switch is turned ON, at step S303, the zoom drive quantity corresponding to a time when TELE-WIDE switch input and ZMSW 216 are turned ON. In addition, the zooming lens 206 is driven by operating the zooming driving circuit 224 based on the computed lens drive quantity.

At the step S302, when the ZMSW 216 is turned ON, the CPU 212 goes to step S304 for executing a sequence of focusing.

Figure 4:
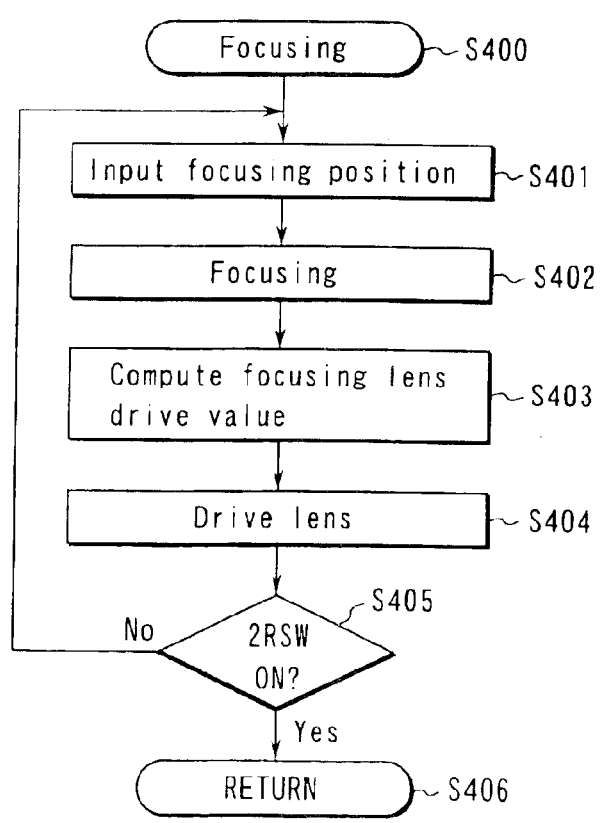
FIG. 4 is a flowchart for illustrating a sequence of focusing at step S305 in FIG. 3.

Next, at the step S304, the CPU 212 judges whether or not the 1RSW 213 is turned ON. When the switch is turned ON, a sequence for focusing is executed at step S305 (the details are shown in FIG. 4).

As described above, when the PC 107 is connected to the electronic still camera 101, the CPU 212 causes the 1RSW 213 to be always turned ON. Alternatively, if a focus is positioned by left-clicking using the click button 111 of the mouse 110, the CPU 212 causes the 1RSW 213 to be turned ON.

Alternatively, when the 1RSW 213 is turned ON, a position of the cursor 108 on the monitor display 109 of the PC 107 may be only detected by the focusing position (distance measurement point) input mechanism 218 (no click).

At the step S304, when the 1RSW 213 is not turned ON, the CPU 212 returns to processing of the step S302.

Next, at step S306, the CPU 212 causes the light measuring means 227 to carry out light measurement, and computes a collimator value based on the thus obtained light measurement data, and the collimator driving circuit 225 is driven based on the obtained collimator value, thereby adjusting the collimator 205.

Next, at step S307, the CPU 212 causes exposure computation.

Next, at step S308, the CPU 212 judges whether or not the 2RSW 214 is turned ON. When the switch is turned ON, processing goes to step S309 at which image is stored. Then, processing returns to the step S302.

At the step S308, when the 2RSW 214 is not turned ON, processing returns to the step S304.

FIG. 4 is a flowchart for illustrating a sequence of focusing at the step S305 in FIG. 3.

First, when the sequence of focusing starts at step S400, the CPU 212 detects a position when the focus position specification cursor 108 of the PC 107 at the PC 107 (or a mere cursor position in the case where no click is made), whereby the focus position data is inputted to the CPU 212.

At this time, the priority of the focusing position is given so as to compute a difference between the prior focus position and another focus position during computation of a lens drive value.

Next, at step S402, the CPU 212 determines a focusing point based on the focus position data inputted from the PC 107, and obtains contrast information on that point.

Next, at step S403, the CPU 212 carries out AF computation in the contrast climbing system based on the contrast information obtained by the processing at the step S402.

In this case, the CPU 212 reads the contrast information on the focusing point determined at the step S402, detects a point at which the contrast value when the focusing lens is driven is a maximum value, and defines the detected value as a focusing lens drive value.

Next, at step S404, the CPU 212 actuates the focusing lens driving circuit 226 based on the focusing lens drive value obtained by the processing at the step S403, thereby driving the focusing lens 204.

Next, at step S405, the CPU 212 judges whether or not the 2RSW 214 is turned ON. When the switch is turned ON, processing returns to an photographing sequence.

As described previously, when the PC 107 is connected to the electronic still camera 101, the CPU 212 judges that the 2RSW 214 is turned ON (left and right click buttons are pressed at the same time) when double-clicking is made by the click button 111 of the mouse 110.

At the step S405, when the 2RSW 214 is turned ON, the CPU 212 repeats operation from step S401.

In the foregoing, as described previously, when the PC 107 is connected to the electronic still camera 101, the CPU 212 of the electronic still camera 101 judges whether or not an external input signal is present. While it is judged that a external input signal is present, an operating section of the PC 107 may be used more preferentially than an operating section of the electronic still camera 101. With respect to a zooming switch as well, the operating member of the PC 107 can be used.

Figure 5A:
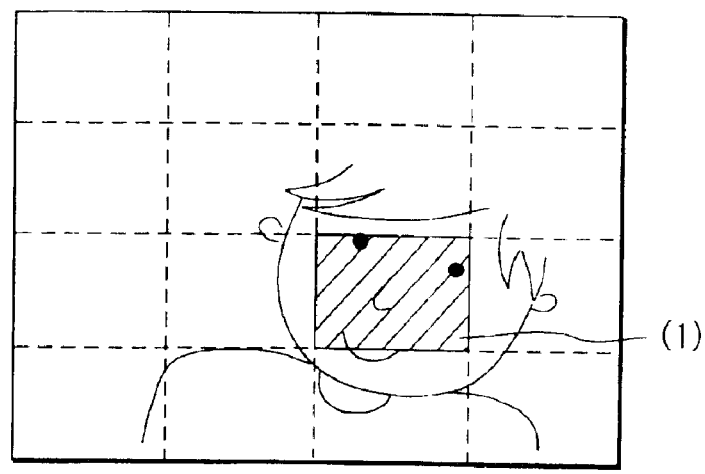
FIG. 5A, FIG. 5B, and FIG. 5C are views each illustrating the detail on input of focus position data at step S401 in FIG. 4.
Figure 5B:
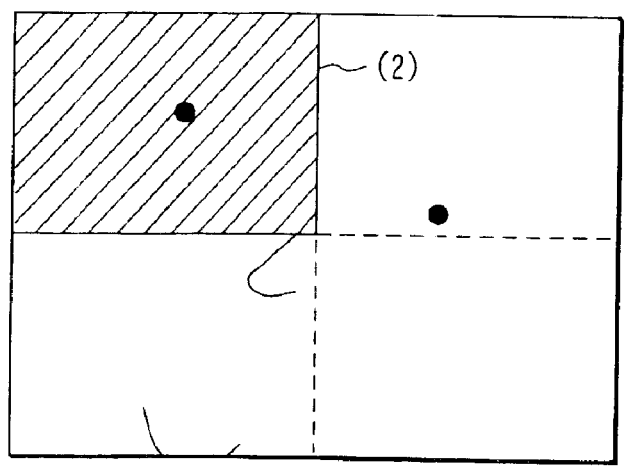
Figure 5C:
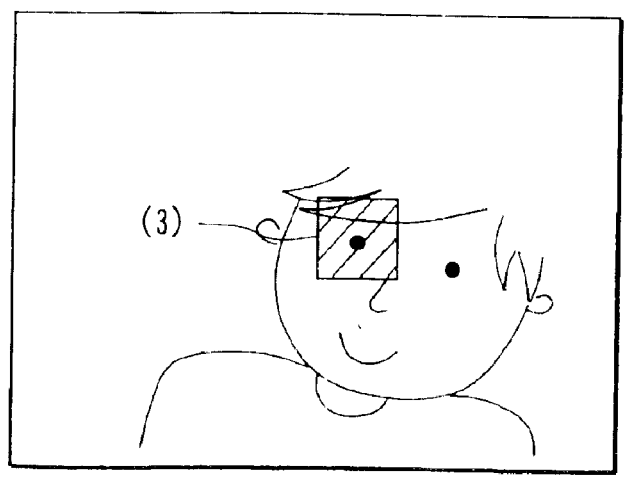

FIG. 5A, FIG. 5B, and FIG. 5C illustrate the details on input of focus position data at the step S401 in FIG. 4.

First, as shown in FIG. 5A, it is assumed that an object image to be displayed on the monitor display 109 of the PC 107 is displayed to be divided into a plurality of arbitrary lattice shaped areas, as indicated by illustrative dashed line.

Here, assuming that the user specifies an area (1) that includes a part of a face region of an object image indicated by the illustrative shading on the monitor display 109 by the focus position specification cursor 108, the face region of the object image in the area (1) is displayed to be enlarged as shown in FIG. 5B.

At this time, the face region of the enlarged object image is displayed to be further divided into a plurality of arbitrary lattice shaped areas, as indicated by the illustrative dashed line.

This lattice shaped area is assumed to indicate a minimum distance measurement area.

Here, assuming that the user specifies an area (2) that includes a part of the face region of the object image indicated by the illustrative shading on the monitor display 109 by the focus position specification cursor 108, a part of the face region of the object image in the area (2), in particular, an eye portion is inputted as an area to be distance measured, i.e., focus position data.

After specifying the area to be distance measured, as indicated by the illustrative dashed line, the display of a plurality of arbitrary lattice shaped area may be released.

In addition, as shown in FIG. 5C, as an area to be distance measured from the start, an area (3) including a part of the face region of the object image indicated by the illustrative shading may be specified by the focus position specification cursor 108.

(Second Embodiment)

Figure 6:
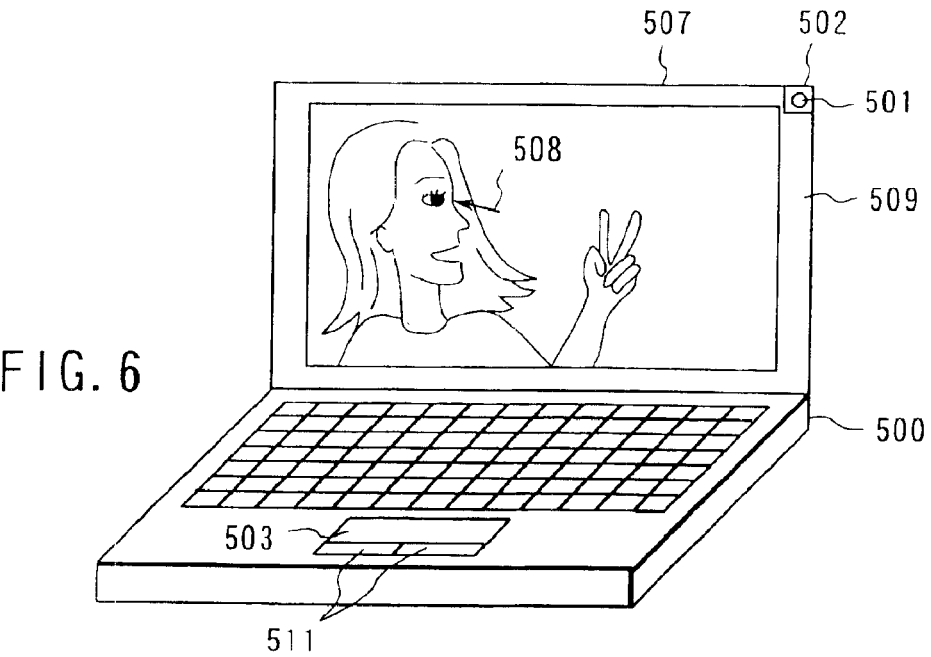
FIG. 6 is a view showing a schematic configuration of an electronic photographing apparatus system according to a second embodiment of the present invention.

FIG. 6 is a view showing a schematic configuration of an electronic photographing apparatus system according to a second embodiment of the present invention.

As shown in FIG. 6, at a PC 500, there are provided a digital photographing optical system 501 which photographs an object that configures an electronic photographing apparatus, thereby obtaining image data, and a photographing optical system operating section 502 capable of changing an orientation of the photographing optical system.

In addition, at the PC 500, there are provided a monitor display 509 which displays image data photographed by the digital photographing optical system 501 that configures the electronic photographing apparatus, a cursor 508 which specifies a focus position (a distance measurement point) on the monitor display 509, and a click button 511 which determines the focus position.

In such configuration, assuming that the electronic photographing apparatus has an internal configuration as shown in FIG. 2, a flowchart of a camera sequence as shown in FIG. 3 and a flowchart of focusing as shown in FIG. 4 are executed, thereby making it possible to realize an electronic photographing apparatus system having a function similar to the electronic photographing apparatus according to the first embodiment described above.

(Third Embodiment)

A configuration of the electronic photographing apparatus system according to the third embodiment is similar to the configuration of the electronic photographing apparatus system shown in FIG. 1 or FIG. 6 and the internal configuration of the electronic photographing apparatus shown in FIG. 2.

In addition, a camera sequence of the electronic photographing apparatus system according to the third embodiment is similar to the flowchart of the camera sequence shown in FIG. 3.

Figure 7:
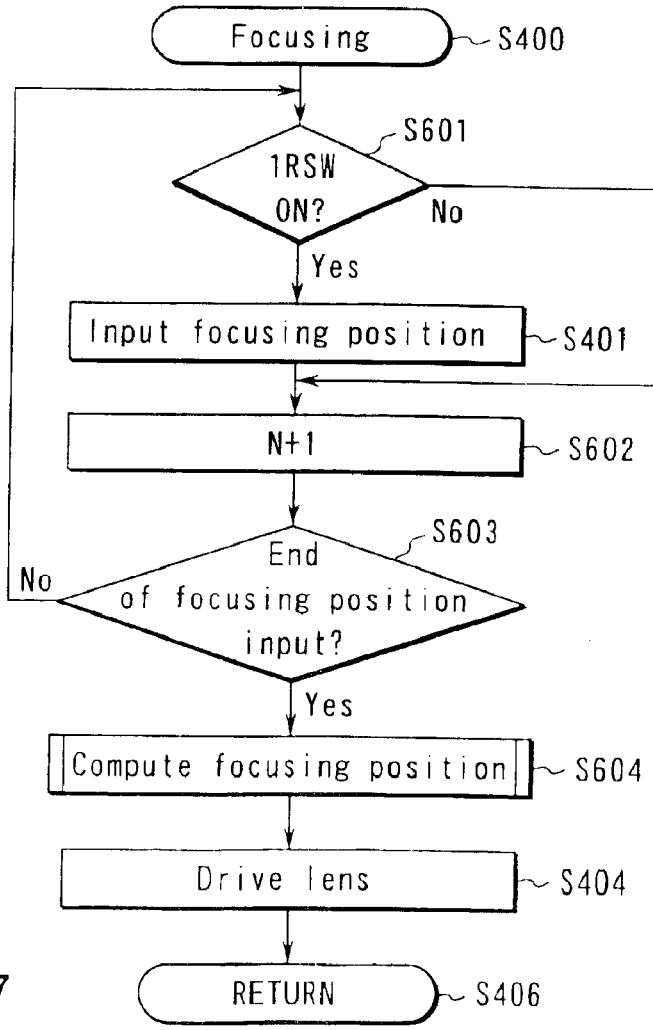
FIG. 7 is a flowchart for illustrating a sequence of focusing (step S305 in FIG. 3) in a camera sequences of an electronic photographing apparatus according to a third embodiment of the present invention.

FIG. 7 is a flowchart showing focusing in a camera sequence (step S305 in FIG. 3) of the electronic photographing apparatus according to the third embodiment.

In FIG. 7, the step numbers identical to those in FIG. 4 are assumed to carry out similar processing.

At step S601, the CPU 212 judges whether or not the 1RSW 213 is turned ON. When the switch is turned ON, processing goes to the step S401 at which the same processing as that in FIG. 4 is carried out. When the switch is not turned ON, processing goes to step S602.

As described previously, when the PC 107 is connected to the electronic still camera 101 in the configuration shown in FIG. 1 or in the configuration shown in FIG. 6, the CPU 212 judges that the 1RSW 213 is turned ON if a focus position is determined by left-clicking using the click button 111 or 511.

Next, at the step S602, the CPU 212 increments the value of an internal counter to N+1.

Here, when a plurality of focusing points are present, N is obtained as 2 or more.

A Next at step S603, the CPU 212 judges whether or not an input signal indicating the end of focus position input is present. When such end input signal is present, processing goes to the step [S604] at which focusing position computation is carried out (the details are shown in FiG. 8).

As described previously, when the PC 107 is connected to the electronic still camera 101 in the configuration shown in FIG. 1 or when the click buttons 111 and 511 are left- and right-clicked (or right-clicked as an input that can be distinguished from turning ON 1RSW 213) at the same time, the CPU 212 judges the end of input.

Next, at the steps S403 and S404, the CPU 212 carries out focusing position computation and lens driving processing similar to those at the steps S403 and S404 in FIG. 4.

Figure 8:
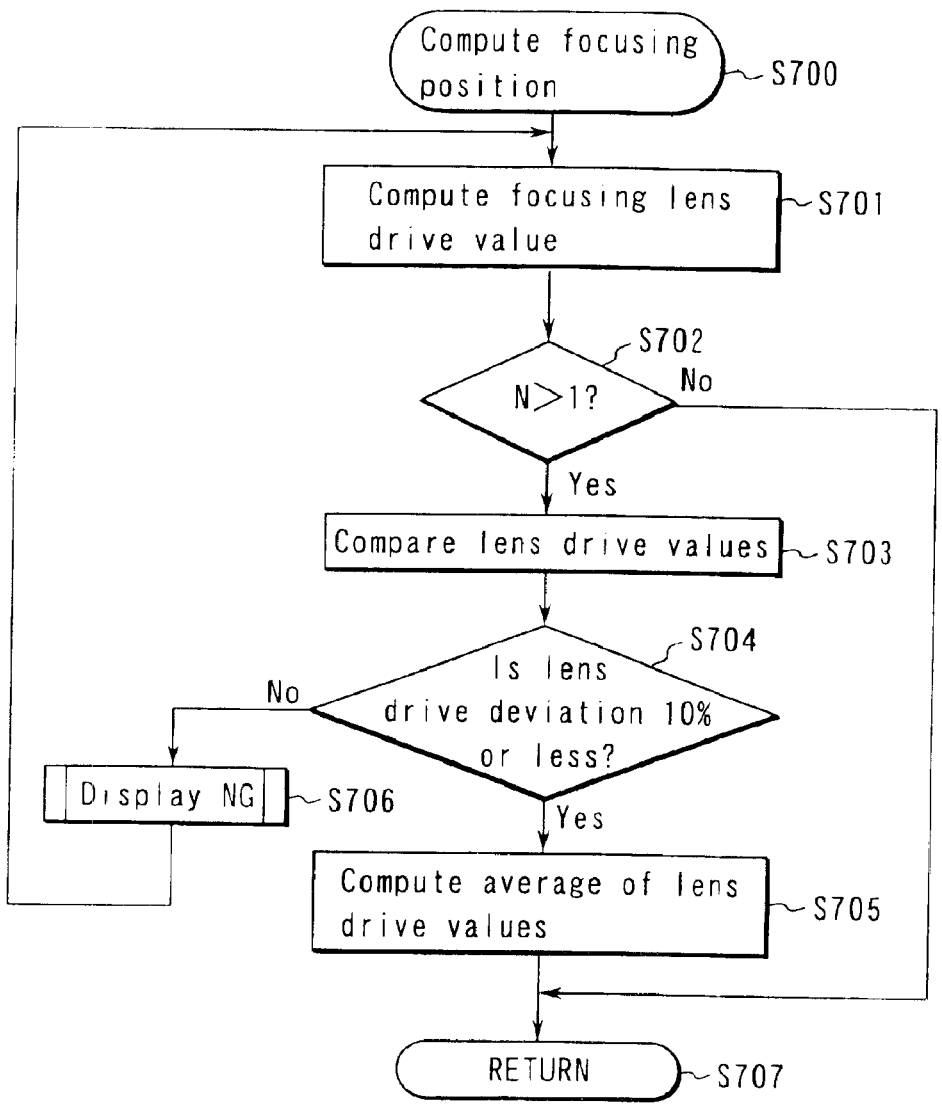
FIG. 8 is a flowchart for illustrating a sequence of focusing position computation at step S604 in FIG. 7.

FIG. 8 is a flowchart showing focusing position computation at step S604 in FIG. 7.

First, when a sequence of focusing position computation starts at step S700, the CPU 212 reads contrast information on a focusing point at step S701. Then, the CPU detects a point when the contrast value when a focusing lens is driven is maximal is detected, and defines the detected value as a focusing lens drive value.

Here, the CPU 212 obtains the lens drive value similarly at each point when a plurality of focusing points are present.

Next, at step S702, the CPU 212 judged whether or not a plurality of focusing points are present. When the judgment result is affirmative, the CPU executes processing at step S703. Otherwise, the CPU executes return processing at step S707.

Next, at the step S703, the CPU 212 compares the focusing lens drive values obtained by the processing at the step S701, and computes the difference.

Here, the CPU 212 carries out general deviation computation ((N1−N2)/N2)×100%) in the case where two focus points are present, and computes a difference between the respective values in the case where three or more focusing points are present.

Next, at step S704, the CPU 212 judges whether or not a difference between lens drive values at the specified points is 10% or less.

At this time, when three or more focusing points are presented, the CPU 212 computes a difference in all the combinations such as points 1 and 2, points 2 and 3, points 1 and 3 . . . .

Among them, when a combination exceeding 10% in difference is presented, the CPU 212 does not judge that such combination is 10% or less.

Here, 10% in difference is an arbitrary value, and thus, is not limited to a value of 10%.

Next, at step S705, the CPU 212 computes an average value of the lens drive value, and defines the computed average value as a focusing lens drive value.

Next, at step S706, when a difference between lens drive values is 10% or more, the CPU 212 causes the monitor display 217 to display a message indicating that focusing is NG. Then, processing returns to the step S701 and thereafter.

Here, during the judgment at the step S704, a pint position whose difference is 10% or more is displayed on the monitor display 217.

Then, at step S707, the CPU 212 terminates processing for focusing position computation after the processing at the step S705, and then, processing returns to a flow of focusing.

Figure 9:
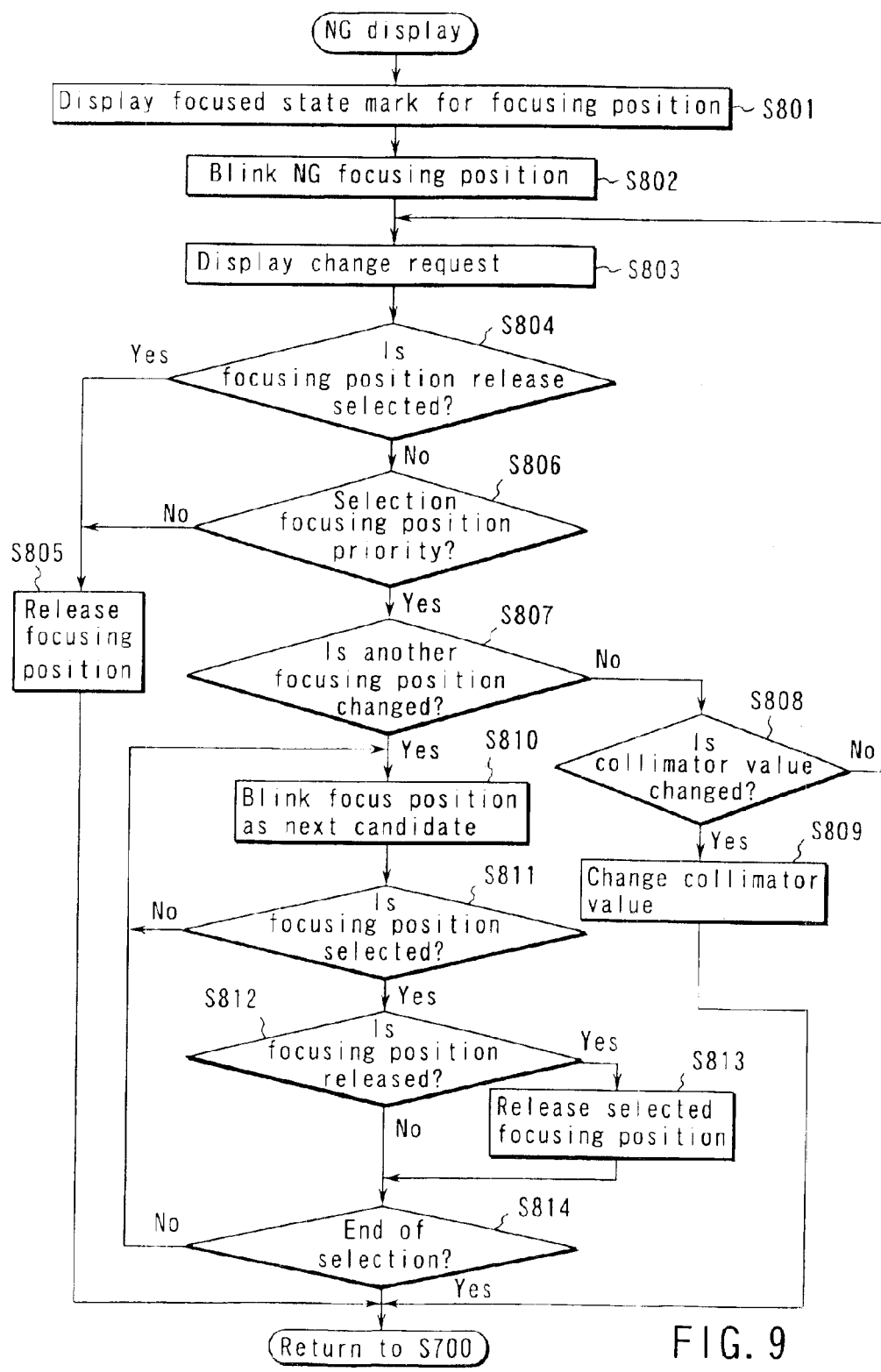
FIG. 9 is a flowchart showing a subroutine when NG is displayed at step S706 in FIG. 8.

FIG. 9 is a flowchart showing a subroutine indicating NG at the step S706 in FIG. 8.

Figure 10A:
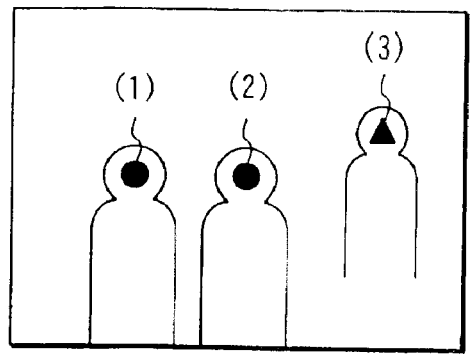
FIG. 10A to FIG. 10D are views illustrating the details at steps S801, S802, S803, and S809 in FIG. 9, respectively.

First, at step S801, the CPU 212 causes the monitor display 217 to display a focus state at a specified focusing position with the illustrative filled circle, as shown in FIG. 10A.

In this case, when an object image (1) on the monitor display 217 is defined as a priority focus position, an object image (2) that is identical in distance in line with the object image (1) as well is assumed as being in the focused state.

Next, at step S802, the CPU 212 blinks NG by using the illustrative filled triangle mark indicating that an object image (3) that is not identical in distance at the rear of the object image (1) and the object image (2) is not in a focused state.

Figure 10B:
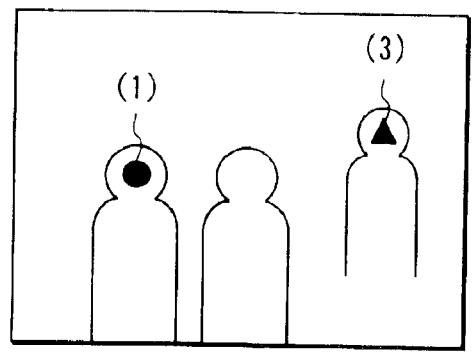
Figure 10C:
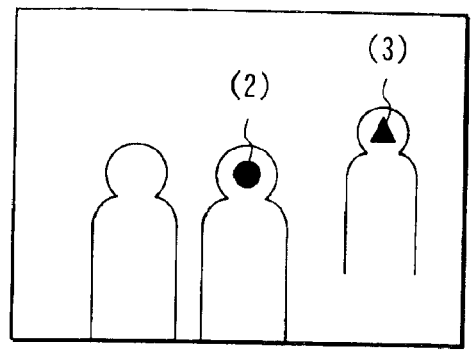

In the foregoing, when a priority focus position is not specified, as shown in FIG. 10B and FIG. 10C, the object image (1) or the object image (2) may be displayed alternately with the illustrative filled circle mark indicating being in a focused state.

Next, at step S803, the CPU 212 causes the monitor display 217 to display a request for changing a specified focus position.

Next, at step S804, the CPU 212 judges whether or not a focus position release selection is present.

Next, at step S805, when a focus position on the monitor display 217 is selected at the step S804, and a desired instructive operation (double-click, right-click, or left-click using the click button 111 of the mouse 110) is inputted, the CPU 212 judges that a focus position release selection is made, and release such selected focus position. Then, processing returns to the step S700.

Next, when the above described input is not made at the step S804, the CPU 212 judges that a focus position release selection is not made. At step S806, the CPU 212 judges whether or not a focus position priority is present. If the judgment result is negative, processing goes to the step S805.

Next, when the selected focus position priority is present at the step S806, the CPU 212 judges whether or not another focus position priority is present at step S807.

When the judgment result is negative at the step S807, the CPU 212 then goes to step S808 at which it is judged that a collimator value change occurs. When the judgment result is affirmative, the collimator value is changed at step S809. Then, processing returns to the step S700. Otherwise, processing goes to the step S803 and thereafter.

Figure 10D:
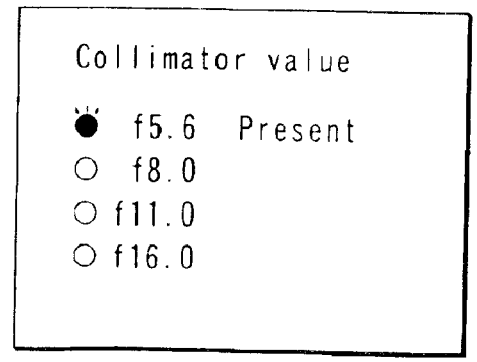

FIG. 10D illustrates a collimator value selection screen displayed on the monitor display 217 when the collimator value is changed at the step S809.

When the CPU 212 judges that another focus position priority is present at the step S807, it causes a focus position to be blinked as a next candidate at step S810. Then, at step S811, the CPU 212 judges whether or not a focus position selection is made. When the judgment result is affirmative, the CPU 212 judges whether or not a focus position is released at step S812.

When the CPU 212 judges that a focus position selection is not made at the step S811, processing goes to the step S810 and thereafter.

Next, in the case where CPU 212 judges that a focus position is released at the step S812, processing goes to step S813 at which the focus position is released. Then, the CPU 212 judges whether or not selection is terminated at step S814. When the judgment result is affirmative, processing returns to the step S700.

Alternatively, when the CPU 212 judges that a focus position is not released at the step S812, the CPU judges whether or not selection is terminated at the step S814. When the CPU 212 judges that selection is terminated, processing returns to the step S700.

In the case where the CPU 212 judges that selection is not terminated at the step S814, processing goes to the step S810 and thereafter.

Therefore, as has been described above, according to the present invention, there can be provided an electronic photographing apparatus comprising a display device for displaying an image to be photographed by a photographer, wherein a focusing position is specified and inputted in advance on a display screen, whereby a desired object on the photographed image enters a focused state.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An electronic photographing apparatus comprising:
   a photographing optical system which photographs an object;
   a data processing section which converts an optical image of the object photographed by the photographing optical system into digital image data, and records the converted image data therein;
   a display section which displays the image data obtained by the data processing section;
   a specification section which specifies a plurality of selected, non-contiguous regions in an image displayed at the display section for joined processing of autofocusing;
   an external operating member capable of externally operating a state of the electronic photographing apparatus; and
   a control section which controls an operation concerning photographing by th electronic photographing apparatus based on information specified by the specification section including the plurality of selected, non-contiguous regions jointly processed in an operation made by the external operating member; the control section making the display section display so as to distinguish a region which can be appropriately processed and a region which cannot be appropriately processed out of the non-contiguous regions specified by the specification section, and
   the control section being capable of releasing a region selected by the specification section when the selected region cannot be appropriately processed with the non-contiguous regions specified by the specification section.

2. The electronic photographing apparatus according to claim 1, wherein said display section is a display member that is independent of said electronic photographing apparatus.

3. The electronic photographing apparatus according to claim 1, wherein the electronic photographing apparatus is disposed in the personal computer.

4. The electronic photographing apparatus according to claim 3, further comprising:
   a photographing optical system operating section capable of changing an orientation of the photographing optical system.

5. The electronic photographing apparatus according to claim 1, wherein the operation concerning photographing is a distance measuring operation for measuring a distance to the plurality of regions specified by the specification section.

6. An electronic photographing apparatus system comprising an electronic photographing apparatus for converting an optical image of a photographed object in digital image data and a personal computer, comprising:
   a display module disposed in the personal computer, which displays the image data;
   a specification module which specifies a plurality of selected, non-contiguous regions in the optical image displayed at the display module for joined processing of autofocusing;
   a distance measuring module disposed in the electronic photographing apparatus, which measures a distance relevant to any of the selected, non-contiguous regions; and
   a control module which controls the distance measuring module to execute a distance measuring operation relevant to any of the selected, non-contiguous regions specified by the specification module, the control module making the display module display module display so as to distinguish a focusable region and an unfocusable region out of the non-contiguous regions specified by the specification module, and
   the control module being capable of releasing a region selected by the specification section when the selected region cannot be appropriately processed with the non-contiguous regions specified by the specification section.

7. An electronic photographing apparatus system according to claim 6, wherein the electronic photographing apparatus is disposed in the personal computer.

8. An electronic photographing apparatus system according to claim 7, wherein the electronic photographing apparatus comprises:
   a digital photographing optical system which photographs an object, thereby obtaining image data; and
   a photographing optical system operating section capable of changing an orientation of the photographing optical system.

9. An electronic photographing apparatus system comprising an electronic photographing apparatus and a personal computer, comprising:

a display device disposed in the personal computer, for displaying an image photographed by the electronic photographing apparatus;

a pointing device disposed in the personal computer or connected thereto;

a distance measuring device disposed in the electronic photographing apparatus; and a control device disposed in the electronic photographing apparatus, the display device displaying so as to distinguish a focusable region and an unfocusable region out of the non-contiguous regions specified by the specification device, and the control device being capable of releasing a region selected by the specification section when the selected region cannot be appropriately processed with the non-contiguous regions specified by the specification section, the control device controlling the distance measuring device to be actuated so as to focus an average distance of a plurality of images when the plurality of images are specified from among the images on the display device by the pointing device for joint processing of autofocusing.

10. An electronic photographing apparatus system according to claim 9, wherein the electronic photographing apparatus is disposed in the personal computer.

11. An electronic photographing apparatus system according to claim 9, wherein the electronic photographing apparatus comprises: a digital photographing optical system for photographing an object, thereby obtaining image data; and a photographing optical system operating section capable of changing an orientation of the photographing optical system.

12. A method for measuring a distance of an electronic photographing apparatus system that is composed of an electronic photographing apparatus for converting an optical image of the photographed object into digital image data and a personal computer, comprising:

photographing an object by the electronic photographing apparatus;

displaying the object image at a display module disposed in the personal computer;

specifying a plurality of images from among the images displayed at the display module for joint processing;

displaying so as to distinguish a focusable region and an unfocusable region out of the non-contiguous regions specified, enabling an operation releasing a specified region when there is an unfocusable region among the specified non-contiguous regions, and causing a distance measuring module disposed in the electronic display module to execute a distance measuring operation relevant to the specified plurality of images for joint autofocusing.

13. The method according to claim 12, further comprising:

determining a plurality of focusing lens drive values based on the distance measuring operation.

14. The method according to claim 13, further comprising:

comparing each of the plurality of focusing lens drive values; and computing a difference between each of the plurality of focusing lens drive values.

15. The method according to claim 14, further comprising:

displaying a message if the step of computing determines that the difference is equal or greater than a specified arbitrary threshold value.

* * * * *